Figure 1:
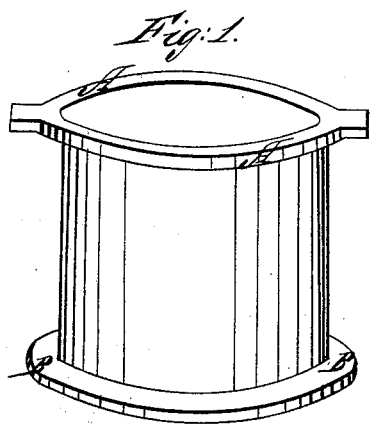

C. W. PIERCE.
CONSTRUCTION OF POTS FOR CHARRING OR BURNING BONES.

No. 65,597.          Patented June 11, 1867.

Witnesses:

Inventor:
C W Pierce

United States Patent Office.

C. W. PIERCE, OF ALBANY, NEW YORK.

Letters Patent No. 65,597, dated June 11, 1867.

IMPROVEMENT IN THE CONSTRUCTION OF POTS FOR CHARRING OR BURNING BONES.

*The Schedule referred to in these Letters Patent and making part of the same.*

Be it known that I, CHARLES W. PIERCE, of the city of Albany, State of New York, have invented a new and useful Improvement in the Construction of Pots employed in Kilns for Burning Bones for manufacturing and agricultural purposes; and I hereby declare the following specification, with the drawing forming part thereof, to be a full and complete description of my invention.

Figure 1 represents in perspective a pot of the kind employed for bone-burning.

Figure 2:
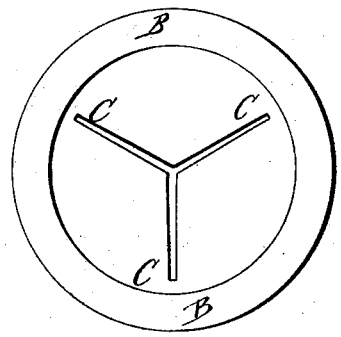

Figure 2, in plan, the bottom of the improved pot.

Figure 3:
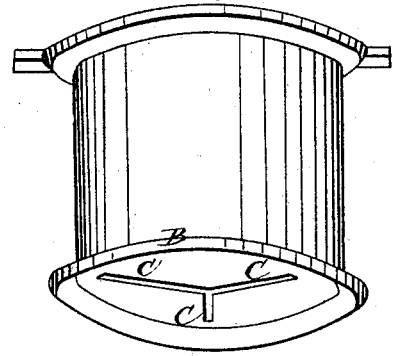

Figure 3, in perspective, the improved pot.

Bone-burning is done in kilns usually of a cylindrical form, and of such size as to contain a large number, (say fifty,) pots. The base of the kiln is formed into a block of furnaces covered by a suitable floor pierced with a number of openings for the passage of the flame into its upper body. This is filled with pots in form like fig. 1, being usually about thirty inches in diameter and the same in height, made of cast iron of considerable thickness.

The pot has a broad rim, A, around its top, and a corresponding one, B, around its bottom, so as to make them of equal diameter. The pots after being charged with bone are placed in rows covering the floor of the kiln. Then over these are piled in succession other pots, their top and bottom flanges being carefully luted together with fire-clay or other suitable material to prevent the flame of the furnace from reaching the contents of the pots. Fire being made in the furnaces, passes up through the openings in the floor between the pots, and envelops them with flame, heating them to redness. It will be noted that by the arrangement of the pots their bottoms are entirely protected from the direct heat of the fire, and only receive that communicated by conduction, consequently that the difference between the temperature of the sides of the pots and of their bottoms is very considerable at all times, and at the commencement of the firing so great as to produce an inequality of expansion of the metal tending to crack the bottoms from the bodies, entirely destroying the vessel. In this way a large number of pots are ruined, requiring a large expense to replace them. Gradual firing of the kiln is only a partial protection, for the heat necessary to calcine the bone requires such a degree of it around the circumference of the pot that it cannot be communicated to the bottom.

The object of my invention is so to construct the bottom of a pot as that this inequality of expansion shall not injure it, and that without regard to the rapidity with which the kiln may be fired up. The remedy is a simple one. From the circumference to the centre of that part of the bottom of the pot which underlies its hollow body, I make narrow radial slots C C C, equidistant from each other, uniting at the centre, making them of a width sufficient to prevent any expansion of the bottom under such heat as the bottom can be exposed to by conduction from the body from closing the slots. Three such slots are shown in the drawing, and are deemed sufficient, but I do not limit myself either to the number of slots or their radial disposition, for it is plain that various arrangements of them might answer the same purpose, but I consider the best arrangement to permit the separated portions of the metal to expand and contract equally to be that I have shown, that is, the division of the bottom by slots into equal segments of the circle. A long and thorough test of such construction has shown the result to be that the bottom of a pot may be made to last if not outlast the service of its body.

What I claim as my invention, and desire to secure by Letters Patent, is—

In the construction of pots for use, as described, the division of the bottom of the pot into parts separated from each other by slots, constructed and arranged as described and for the purposes set forth.

C. W. PIERCE.

Witnesses:
RICHD. VARICK DE WITT,
D. W. DE WITT.